Oct. 4, 1932. V. LOUGHEED 1,880,207
POROUS COVERING FOR AIRCRAFT
Filed Feb. 26, 1931 2 Sheets-Sheet 1

Victor Lougheed
INVENTOR

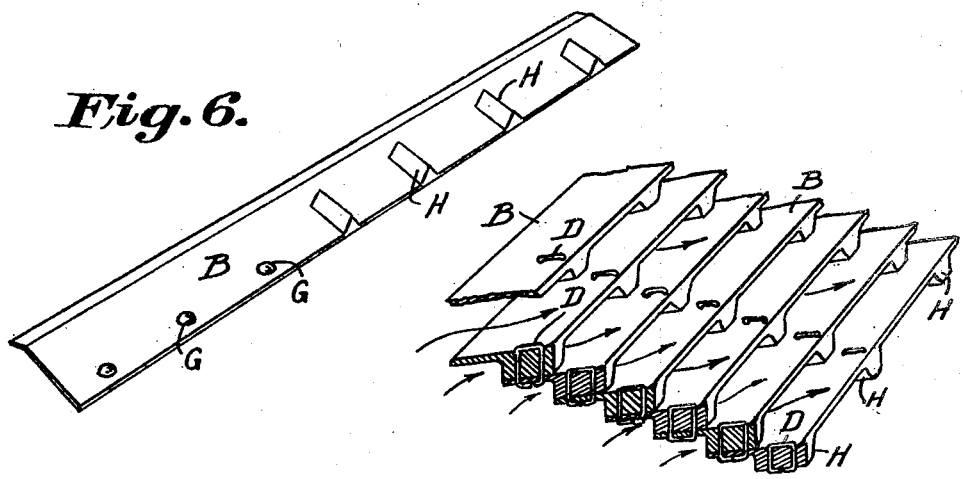
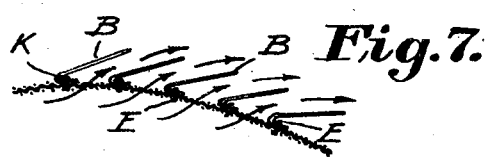
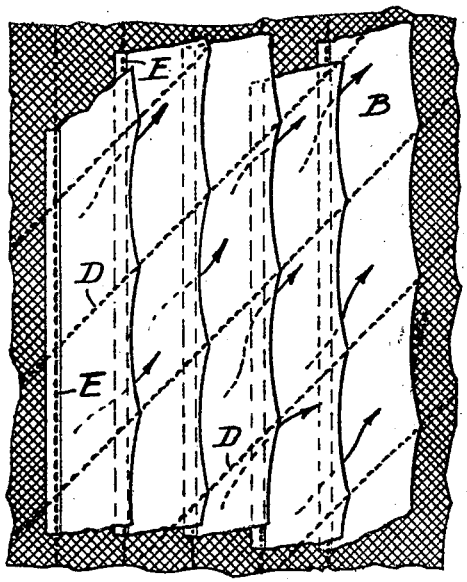

Patented Oct. 4, 1932

1,880,207

UNITED STATES PATENT OFFICE

VICTOR LOUGHEED, OF WASHINGTON, DISTRICT OF COLUMBIA

POROUS COVERING FOR AIRCRAFT

Application filed February 26, 1931. Serial No. 518,554.

My discovery or invention relates primarily to the sustaining elements of aeroplanes since it has for its object the provision of a novel type of surfacing, beneficially and usefully applicable to aeroplane wings, to render them more effective—with application to aircraft control and other surfaces, to direct the relative airflow thereover, to render these also more effective, as a secondary object—all for the purpose of improving, and rendering more efficient and safe, aeroplane performance and operation.

Another object of my invention is to provide an aircraft surfacing which, while freely pervious to air passing from its underside to its topside, is substantially impervious to rain or moisture falling or condensing upon its topside, and which, when wetted, cannot swell up or absorb water in such a manner as to render it impervious to air.

A further object is to provide a surfacing which, in addition to possessing the requisite aerodynamic properties is economical and easy to fabricate, durable, and easy to maintain, and which is constituted of inexpensive and generally-available materials.

In its essential features, my discovery or invention consists in the development, for sustaining or control surfaces of suitable cross-sectional form, of a specialized type of covering therefor possessed of characteristics which exert a positive and beneficial control upon the direction of the relative airflow over and beneath such surfaces.

While, to yield its greatest gains in the way of improving aeroplane efficiency, my discovery or invention requires that the texture of my porous surfacing for aircraft conform closely to certain principles and, demands combination with the most suitable wing and control-element plan forms and sections, its application even to inferior plan forms and sections, and in inferior embodiments, can be of some benefit, for which reason I do not limit this specification or the claims hereof to the best embodiments of my invention.

As pointed out at greater length in the specifications of earlier United States patent applications, Serial Number 328,982, filed by me on 28 December 1928, and Serial Number 514,619, filed by me on 9 February 1931, and also relating to the control of airflow over aircraft surfaces, all natural flight is accomplished with wings provided with very deep undercamber or concavity, whereas all established artificial flight depends upon the use of sustaining elements the undersides of which are only most slightly undercambered, if at all—being more often flat or even convex.

The reason for this is that, in designing his artificial sustaining elements, man has not heretofore learned how to control the relative airflow to the contours of an undercambered wing. And I have discovered that such flow control is a means for rendering the deeply undercambered wing—useless without it—and a much safer and more efficient device for transporting a burden upon the air than it is in any way possible to make of the conventional, substantially flat-bottomed "airfoil" of present accepted and universally-prevailing aeroplane practice.

With the foregoing and other objects in view, my invention consists in the construction and arrangement of parts as will be described more fully hereinafter.

Reference is to be had to the accompanying drawings forming a part of the specification, in which like reference characters indicate corresponding parts throughout the several views, and in which.

Figures 3, 4, 5:
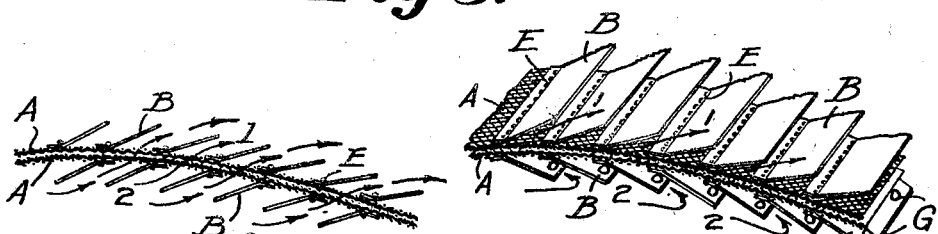
Figure 3 is presented for comparison, and represents the same wing cross section of Figure 2, but in this case surrounded by airflow of the undesirable type which normally occurs in the absence of flow control.
Figure 4 depicts a modified form or embodiment of my discovery or invention.

Figure 5 presents another modified form or embodiment of my discovery or invention.

Figure 6 shows a detail of the modified structure illustrated in Figure 5.

Figure 7 shows another modification, of possible value in some applications, of my invention.

Figure 8 shows an embodiment which eliminates one element of the other views.

Figure 9 shows a detail of a form of attaching means used in my invention.

Figure 1:
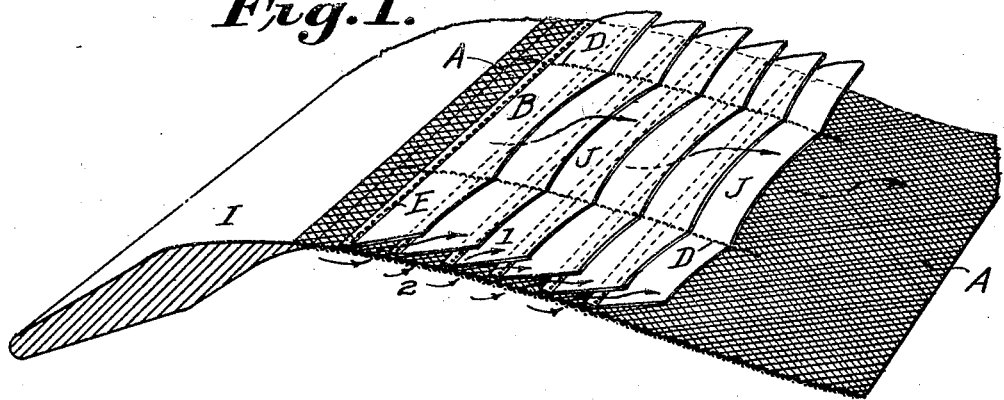
Figure 1 shows a cross-sectional and partial-plan view of prospective section of a portion of an aircraft wing having a porous surfacing embodying features of my discovery or invention.

Referring now to Figure 1, it is to be noted that the surfacing or covering shown differs uniquely from ordinary porous surfacings in that air seepage 2, through it, from underside to topside, cannot issue from the topside in jets normal to the surface, but is constrained to issue therefrom in jets 1 substantially tangent to the surface.

It is well known that jets, as at 1, Figure 1, issuing through a surface at angles substantially tangent to such surface, and in the direction of a relative airflow over such surface, have a marked useful effect in blowing off the boundary layer of air which tends to adhere to and pile up upon the surface, and the pressure of which is very detrimental to laminar flow and is a cause of turbulence, which impairs the functional efficiency of the surface.

Similarly suction, as at 2, Figure 1, of a portion of the relative airflow passing over a surface, into small interstices provided in a surface, may keep the boundary layer from building up on the surface, and thus may contribute to maintaining the functional efficiency of such a surface.

Figure 2:
Figure 2 is a cross section of a deeply-cambered wing with airflow around and through it indicated by streamlines and arrows, and showing the desirable type of flow produced when the flow is controlled.

Thus my covering or surfacing, applied over ribs or other structural elements of a suitable wing I, as illustrated in Figure 2, which functions through air of relatively lower pressure adjacent to its topside and of relatively higher pressure adjacent to its underside, becomes a means of sucking off the underside boundary layer and of blowing off the topside boundary layer, which is materially more effective for these purposes than is a mere porous surface, straight through which the air seepage can pass, without being changed in direction within the surface of the wing.

Controlled as the surfacing of my discovery or invention controls them, when applied to a wing, the numerous minute jets of flowing air, by being diverted substantially ninety degrees within the surfacing from a straight-through direction are made to contribute to lift and to reduction of drag. Air flowing straight through a surface, whatever benefits it may confer in the way of controlling the relative airflow, inevitably subtracts somewhat from lift and can have no directly-beneficial effect in reducing drag. These objections to other porous surfacings that of my discovery or invention avoids.

To fabricate my covering or surfacing, I use a porous subsurface A, Figure 1, and shingle this all over with thin strips or tapes of impervious material B, each overlapping its neighbor on one side and overlapped by its neighbor on the other, as shown, and each affixed to the subsurface as at E, by its edge which is overlapped by the strip next to it on one side, so that its free edge overlaps the strip next to it on the other side.

Since there are many possible materials which might be used for strips and subsurface, and many possible ways of assembling them together, I do not limit myself to any preferred embodiment, in these respects, of my discovery or invention, but for various obvious reasons I do prefer to constitute my subsurface of a freely—pervious open-mesh fabric, of metal or organic material, and the applied strips of substantially—impervious fabric or other material smoothed and waterproofed if necessary by rubberizing or coating with pyroxylin or other compound, and to attach the strips to the subsurface by stitching them thereto as at E, along one edge of each.

The width of the strips is determined by varying conditions of flow velocity and pressure gradients and differentials, as well as by rate of leak allowed, to provide that in all cases the separation from one jet to the next must not exceed in width an extent of surface over which the given jet can dispose of the boundary layer.

The individual jets can be readily throttled to any desired magnitude by the application of either or both of two expedients incorporated in the design of any given surfacing. The perviousness of the subsurface can be made anything that may be desired by providing fabric of appropriate tightness or looseness of weave. And the spaces under the free edges of the strips can be kept very narrow or allowed to be wider.

The latter consideration requires attention to the cross-stitchings or attachment points shown at D, Figure 1. The primary purpose of these lines of stitching or attaching is to hold the strips or tapes to the subsurface in such a manner that they cannot lift or be blown up at right angles thereto—a condition that would defeat the purpose of the structure by allowing the issuing jets 1 to exit from the surface normal rather than tangent to it. But an important secondary purpose of these cross attachments is to control, by their spacing the amount which the tapes belly under the air pressure, at J, this bellying, with the strips B made of flexible fabric, being necessary to allow the air to escape. Obviously by reducing the spacing from D to D the jet flow can be correspondingly throttled or restricted, while by increasing the spacing of D, the seepage through the surface is made more free.

I desire it to be understood that the cross stitching D, may be arranged in any desirable way such as is shown in Figure 9 wherein the stitchings or attachment points D, are placed in rows that are at an angle to the rows of stitching E. In this manner, the form that permits air to follow the line of least resistance, can be obtained, if necessary.

For some uses it is thought desirable to control the angle of inflow on the underside of the wing, in which case, doubling my surfacing, by inverting one shingled subsurface upon another, as in Figure 4, may have useful applications.

In other cases, it may be even useful to invert and reverse upon each other two stitched-together surfaces of my invention, to afford the condition illustrated in Figure 5.

In the cases of Figure 4 and Figure 5, particularly the latter, a tendency of the relative airflow to press the tapes together, and so to close up the openings left by the bellying J, Figure 1, may be prevented by providing each tape, along its overlapping edge, Figure 6, with a row of points G or ridges H, to hold the tapes apart as at G, Figure 5, when they are assembled.

By using tapes of moderate stiffness and turning them back from their stitched edges, as illustrated in Figure 7, before cross stitching, the resulting curvature of the tapes as at K confers upon the air passages between the tapes a somewhat better aerodynamic form.

By merely arranging overlapping strips of tape, B, Figure 8, without the edge stitching E, the porous subsurface A may be reduced to the threads of the cross stitching D, particularly if these cross stitchings are close together, and the tapes provided with the ridges, H. The points G of Figure 6 may be substituted in this modification for the ridges H.

It will be understood that the above description and accompanying drawings comprehend only the general and preferred embodiment of my invention, and that various changes in construction, proportion and arrangement of parts may be made within the scope of the appended claims, and without sacrificing any of the advantages of my invention.

What I claim is:

1. A porous covering for aircraft structures comprising a freely-pervious surfacing, and means secured to said surfacing for controlling the airflow through said surfacing.

2. A porous covering for aircraft structures comprising a freely-pervious surfacing, and impervious strips secured to said pervious surfacing for directing the air passing through the pervious surfacing.

3. A porous covering for aircraft structures comprising a freely-pervious surfacing, evenly spaced strips secured to the top of said surfacing, and means holding said strips in an overlapped position to each other so as to form air passages between them.

4. A porous covering for aircraft wings comprising a pervious surfacing, strips having an impervious upper surface, means securing said strips in parallel relation to each other to said pervious surfacing, and evenly spaced transverse attaching means for holding said strips down so as to form air passages between the strips.

5. A porous covering for aircraft structures comprising impervious tapes, means securing said tapes together in overlapping relation to each other, and means spacing said overlapping portions of the tapes from each other whereby air passages are formed between the tapes.

6. A porous covering for aircraft surfaces comprising a pervious surfacing, impervious strips, means securing one edge of said strips to said pervious surfacing and means holding said strips in overlapped relation to each other so as to form air passages between the strips and within the limits of the holdings means.

7. A porous covering for aircraft surfaces comprising a pervious surface, impervious strips, means attaching one edge of said strips in parallel spaced relation to each other, to said pervious surfacing, means holding said strips in overlapped positions to each other, and spacing members between said strips whereby air passages are formed between the strips and the spacing members.

8. In a deeply undercambered aircraft wing a thick forward portion impervious to air and a rearward portion having a porous covering consisting of a freely-pervious surfacing, and impervious strips secured to said pervious surfacing for directing the air passing through the pervious surfacing.

9. In a deeply undercambered aircraft wing a thick forward portion impervious to air, and a relatively thin rearward portion having a porous covering consisting of a pervious surfacing, impervious strips, means securing said strips in parallel relation to each other to said pervious surfacing, and evenly spaced transverse attaching means for holding said strips down so as to form air passages between the strips.

VICTOR LOUGHEED.